(12) United States Patent
Fujiwara et al.

(10) Patent No.: US 6,686,089 B1
(45) Date of Patent: Feb. 3, 2004

(54) BATTERY ELECTRODE, SECONDARY BATTERY, AND METHOD OF MANUFACTURING SAME

(75) Inventors: Masaki Fujiwara, Tokyo (JP); Gaku Harada, Tokyo (JP); Shinako Okada, Tokyo (JP); Toshihiko Nishiyama, Tokyo (JP)

(73) Assignee: NEC Tokin Corporation, Miyagi (JP)

( * ) Notice: Subject to any disclaimer, the term of this patent is extended or adjusted under 35 U.S.C. 154(b) by 0 days.

(21) Appl. No.: 09/384,594

(22) Filed: Aug. 27, 1999

(30) Foreign Application Priority Data

Sep. 4, 1998 (JP) ............................. 10-250254

(51) Int. Cl.$^7$ ..................... H01M 4/60; H01M 4/62
(52) U.S. Cl. ........................ 429/213; 429/212
(58) Field of Search .................. 429/213, 212

(56) References Cited

U.S. PATENT DOCUMENTS

| | | | |
|---|---|---|---|
| 4,343,871 A | * | 8/1982 | Tobishima et al. ........... 429/197 |
| 4,366,216 A | * | 12/1982 | McGinness ................. 429/213 |
| 4,535,039 A | * | 8/1985 | Naarmann et al. .......... 429/213 |
| 4,820,595 A | * | 4/1989 | Macdiarmid et al. ......... 429/27 |
| 5,382,481 A | * | 1/1995 | Fleischer .................... 429/192 |

FOREIGN PATENT DOCUMENTS

| | | |
|---|---|---|
| JP | 55-161375 | 12/1980 |
| JP | 55-161376 | 12/1980 |
| JP | 59-169068 | 9/1984 |
| JP | 59-196568 | 11/1984 |
| JP | 59-196573 | 11/1984 |
| JP | 60-263420 | 12/1985 |
| JP | 62-43066 | 2/1987 |
| JP | 63-301462 | 12/1988 |
| JP | 63-301465 | 12/1988 |
| JP | 4-87258 | 3/1992 |
| JP | 4-146965 | 5/1992 |
| JP | 4-147511 | 5/1992 |
| JP | 7-130356 | 5/1995 |
| JP | 7-169505 | 7/1995 |
| JP | 8-124569 | 5/1996 |
| JP | 10-92435 | 4/1998 |
| JP | 10-106579 | 4/1998 |
| JP | 10-154512 | 6/1998 |
| JP | 10-321217 | 12/1998 |

* cited by examiner

*Primary Examiner*—Carol Chaney
(74) *Attorney, Agent, or Firm*—Young & Thompson

(57) ABSTRACT

A battery electrode is obtained by coating an electrically conductive film serving as a collector with an aqueous solution of formic acid containing polypyridine, which is an active material, in dissolved form as well as carbon powder serving as a conduction aid, and drying the solution on the film. A secondary battery is manufactured using such electrodes.

23 Claims, 8 Drawing Sheets

7 ; COLLECTOR
8 ; ACTIVE MATERIAL (ORGANIC POLYMER)
9 ; CARBON PARTICLES

1 ; POSITIVE-ELECTRODE COLLECTOR
2 ; LAYER CONTAINING POSITIVE-ELECTRODE ACTIVE MATERIAL
3 ; LAYER CONTAINING NEGATIVE-ELECTRODE ACTIVE MATERIAL
4 ; NEGATIVE-ELECTRODE COLLECTOR
5 ; ELECTROLYTE
6 ; SEPARATOR

7 ; COLLECTOR
8 ; ACTIVE MATERIAL (ORGANIC POLYMER)
9 ; CARBON PARTICLES

7 ; COLLECTOR
8 ; ACTIVE MATERIAL (ORGANIC POLYMER)
9 ; CARBON PARTICLES
10 ; ORGANIC BINDER

11 ; WORKING ELECTRODE
12 ; OPPOSING ELECTRODE
13 ; REFERENCE ELECTRODE
14 ; MEASUREMENT SOLUTION

BATTERY ELECTRODE, SECONDARY BATTERY, AND METHOD OF MANUFACTURING SAME

FIELD OF THE INVENTION

This invention relates to a battery electrode, a secondary electrode and a method of manufacturing this electrode and battery.

BACKGROUND OF THE INVENTION

The electrodes of a secondary battery according to the prior art generally are manufactured using an organic binder or a binding agent for the sake of shape retention. A battery electrode that uses an organic binder or a binding agent, a secondary battery that employs such battery electrodes and a method of manufacturing the electrodes and secondary battery according to the prior art will now be described.

FIG. 3 is a diagram schematically illustrating a conventional secondary battery electrode that uses an organic binder. More specifically, FIG. 3 is an enlarged sectional view of the electrode taken in the direction of collector thickness. The electrode depicted in FIG. 3 is obtained by binding an active material 8 and carbon particles 9 to the surface of a collector 7 by an organic binder 10. An organic polymer in which adsorption and desorption of protons participates in the oxidation-reduction reaction of a positive electrode or negative electrode is used as the active material 8.

The electrode is formed by applying the electrode mixture to the surface of the collector and then drying the same. The electrode mixture consists of the aforesaid organic polymer serving as the active material, carbon powder serving as a conduction aid, and the organic binder for binding the polymer and powder together. The organic binder is an organic polymer that does not exhibit electron conductivity and has absolutely no proton conductivity.

The conventional secondary battery has two electrodes fabricated in the above-described manner, and the two electrodes are arranged to oppose each other across an electrolyte and separator. The secondary battery is fabricated by bringing the two electrodes into opposition via the electrolyte and separator.

SUMMARY OF THE DISCLOSURE

In the course of investigations toward the present invention the following problems have been encountered.

The conventional battery electrode manufactured using an organic binder is disadvantageous in that the efficiency of active material utilization is low as well as the yielding rate of capacity (e.g., capacity yield per unit weight). The reason for this is that the organic binder scattered on the surface of the active material impedes the conduction of protons and electrons and makes it difficult for the oxidation-reduction reaction to proceed.

Further, the method of manufacturing the conventional battery electrode using the organic binder is inadequate in terms of film manufacturing workability and productivity when the electrode is fabricated. The reason for this is that the above-mentioned electrode mixture tends to coalesce and experience a decline in fluidity owing to the use of the organic binder. Furthermore, electrode film thickness and electrode weight tend to be non-uniform, making it difficult to suppress variations in battery capacity from one battery to another.

Accordingly, an object of the present invention is to provide a battery electrode and a secondary battery in which an improvement in efficiency of active material utilization and yielding rate of capacity are achieved.

Another object of the present invention is to provide a battery electrode manufacturing method and secondary battery manufacturing method featuring improved film manufacture workability and productivity at the time of electrode fabrication.

Further objects of the invention will become apparent in the entire disclosure.

A battery electrode according to a first aspect of the present invention includes at least one type of organic polymer and a carbon material which serves as a conduction aid, wherein the organic polymer is, in its entirety, a compound which produces an oxidation-reduction reaction due to electrochemical proton adsorption and desorption.

A battery electrode according to a second aspect of the present invention includes a dried product of a solution containing at least one type of organic polymer in dissolved form and powder of a carbon material, wherein the organic polymer is, in its entirety, a compound which produces an oxidation-reduction reaction due to electrochemical proton adsorption and desorption.

In a third aspect of the present invention, a secondary battery uses a battery electrode according to the present invention as a positive electrode, a negative electrode or both.

In a fourth aspect of the present invention, a method of manufacturing a battery electrode includes at least a step of forming a dried product of a solution containing at least one type of organic polymer in dissolved form and powder of a carbon material, wherein a compound which produces an oxidation-reduction reaction due to electrochemical proton adsorption and desorption is used as the entirety of the organic polymer.

In a fifth aspect of the present invention, a method of manufacturing a secondary battery includes using a battery electrode, which has been manufactured by the method of manufacturing a battery electrode according to the present invention, as a positive electrode, a negative electrode or both.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
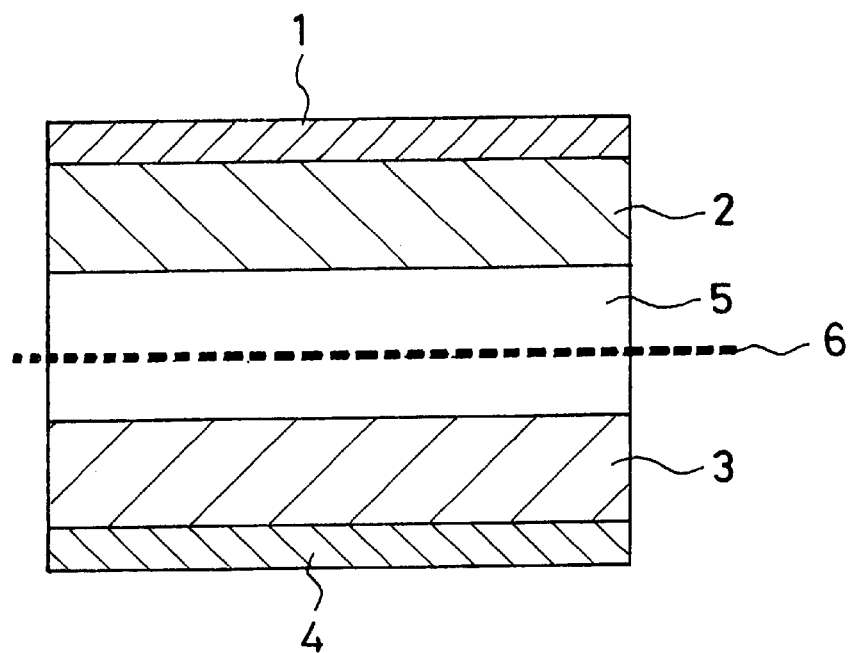
FIG. 1 is a schematic, enlarged sectional view of a secondary battery according to a first example of the present invention, the view being taken in the thickness direction of the collector of a negative electrode.

Preferred embodiments of the present invention will now be described.

Battery Electrode and Method of Manufacture

A battery electrode according to the present invention preferably includes at least one type of organic polymer and a carbon material which serves as a conduction aid, wherein the organic polymer is, in its entirety, a compound which produces an oxidation-reduction reaction due to electrochemical proton adsorption and desorption. Further, a battery electrode according to the present invention in another aspect thereof preferably includes a dried product of a solution containing at least one type of organic polymer in dissolved form and powder of a carbon material, wherein the organic polymer is, in its entirety, a compound which produces an oxidation-reduction reaction due to electrochemical proton adsorption and desorption.

The entirety of the organic polymer in the battery electrode of the present invention is a compound which produces an oxidation-reduction reaction due to electrochemical proton adsorption and desorption. In the battery electrode of the present invention, the at least one type of organic polymer constituting the electrode is at least one type selected from π-conjugated polymers, which include nitrogen atoms, and polymers of derivatives thereof. Further, the at least one type of organic polymer constituting the electrode preferably is at least one type selected from polymers of quinone compounds and derivatives thereof.

An electrode in which the at least one type of organic polymer constituting the electrode is at least one type selected from polymers of π-conjugated high polymers having an amino group within the Mecule can be used as a positive electrode. Further, an electrode in which the at least one type of organic polymer constituting the electrode is at least one type selected from polymers of pyridine, pyrimidine and/or derivatives thereof can be used as a negative electrode. Further, an electrode in which the at least one type of organic polymer constituting the electrode is at least one type selected from polymers of naphthoquinone, anthraquinone and/or derivatives thereof can be used as a positive or negative electrode.

A battery electrode according to the present invention can include at least one type of quinone compound, and the quinone compound can be at least one type from among naphthoquinone, anthraquinone and derivatives thereof. Such an electrode can be used as a positive electrode and a negative electrode.

According to a method of manufacturing a battery electrode according to the present invention, the surface of a collector preferably is coated with a solution containing at least one type of organic polymer in dissolved form and powder of a carbon material in dispersed form, whereby a dried product of the solution can be formed on the surface of the collector. A polar solvent or water, which is capable of dissolving the at least one type of organic polymer, preferably is used as the solvent of the solution.

Examples of typical organic polymers which produce an oxidation-reduction reaction due to electrochemical proton adsorption and desorption are π-conjugated polymers which include nitrogen atoms, namely polymers of nitrogen-containing compounds from among π-conjugated polymers, or polymers of quinone and quinone compounds such as derivatives of quinone. Two or more types of these compounds may be used in combination in the polymers.

The polymer of the nitrogen-containing compound preferably is those of a compound having an amino group in its Mecule, a compound having a nitrogen atom in its aromatic ring, e.g., aniline, dimethylaniline, anilinesulfonic acid, pyrrole, pyridine and pyrimidine, and polymers of derivatives thereof. Examples of polymers of quinone compounds include those of anthraquinone, naphthoquinone, benzoquinone and/or derivatives thereof.

Many of the above-mentioned organic polymers are not sufficiently conductive. Therefore, in order to impart these substances with electron conductivity and construct a network of electron conduction over the entirety of the electrode, a mixture of these materials with a carbon material serving as a conduction aid is employed as the electrode. The weight ratio of the above-mentioned organic polymer to the carbon material serving as the conduction aid is, e.g., 7:30 to 97:3. Examples of the carbon material serving as the conduction aid are finely divided powders of conductive carbon mater a is such as acetylene black, aniline black, activated carbon and graphite powder. The carbon material used can have an average particle diameter of, e.g., less than 10 μm.

In order to mix the organic polymer and carbon material together uniformly and affix the mixture to the collector, the organic polymer is dissolved in water or a prescribed solvent that is capable of dissolving the organic polymer, the powder of carbon material is mixed in to prepare an electrode mixture, and the electrode mixture is applied to the collector to form a coating of a liquid electrode mixture. Furthermore, the coating of the electrode mixture preferably is heated to forcibly dry mixture, thereby forming a dry layer in which the particles of the carbon material are dispersed in the organic polymer.

In the formation of the dry layer, no use is made of organic binders such as polytetrafluoroethylene, polyvinyl butylate, polyvinylidene fluoride and polyamide imide, which are used in the well-known method of the prior art. In a case where two or more types of organic polymer are used in combination, at least one of the organic polymers should be soluble in water or in a prescribed solvent.

In the battery electrode of the present invention, an organic polymer such as a binding agent or binder that does not participate in the battery reaction at all is not essential, and the electrode can be manufactured substantially without using any such organic polymer whatsoever. Accordingly, the entirety of the organic polymer formed on the collector is capable of producing an oxidation-reduction reaction due to proton adsorption and desorption and is capable of producing an oxidation-reduction reaction due to proton adsorption and desorption and is capable of participating in the battery reaction. The battery electrode of the present invention is ideal for use as the electrode of a secondary battery.

Secondary Battery and Method of Manufacture

A secondary battery according to the present invention preferably is such that the electrolyte includes protons and only the protons participate in electron transfer that accompanies the oxidation-reduction reaction of the organic polymer in the battery electrode of the present invention. The electrolyte preferably is an aqueous solution, non-aqueous solvent, solid electrolyte or gel electrolyte that either includes protons or exhibits proton conductivity.

The secondary battery according to the present invention can be fabricated by interposing an electrolyte between two electrodes. The electrolyte used can be an aqueous solution or non-aqueous solution that includes protons or a solid electrolyte or gel electrolyte exhibiting proton conductivity, though the electrolyte is not limited to these.

In accordance with the present invention, (1) an improvement in efficiency of active material utilization and yielding rate of capacity are achieved, and (2) film manufacture workability and productivity at the time of electrode fabrication are improved. The reasons why these effects are obtained can be summarized as the two points set forth below.

(1)<Promotion of the Oxidation-reduction Reaction due to an Improvement in Proton Conductivity and Electron Conductivity at the Surface of the Active Material>

Figure 7:
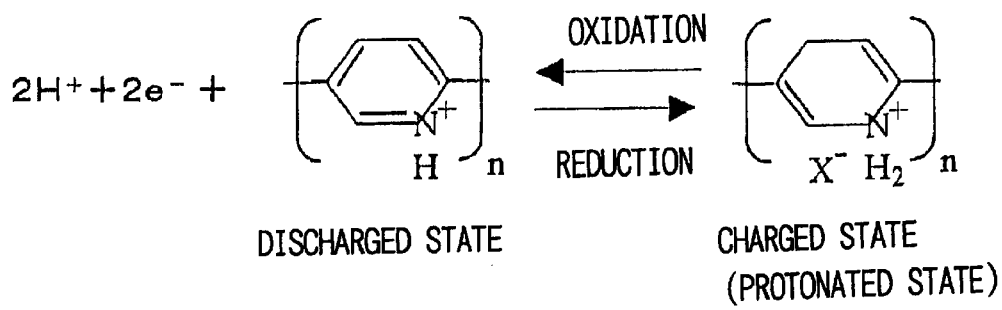
FIG. 7 is a diagram showing a charge/discharge reaction equation of a negative-electrode active material Ppy in a secondary battery according to the first example of the present invention.
Figure 8:
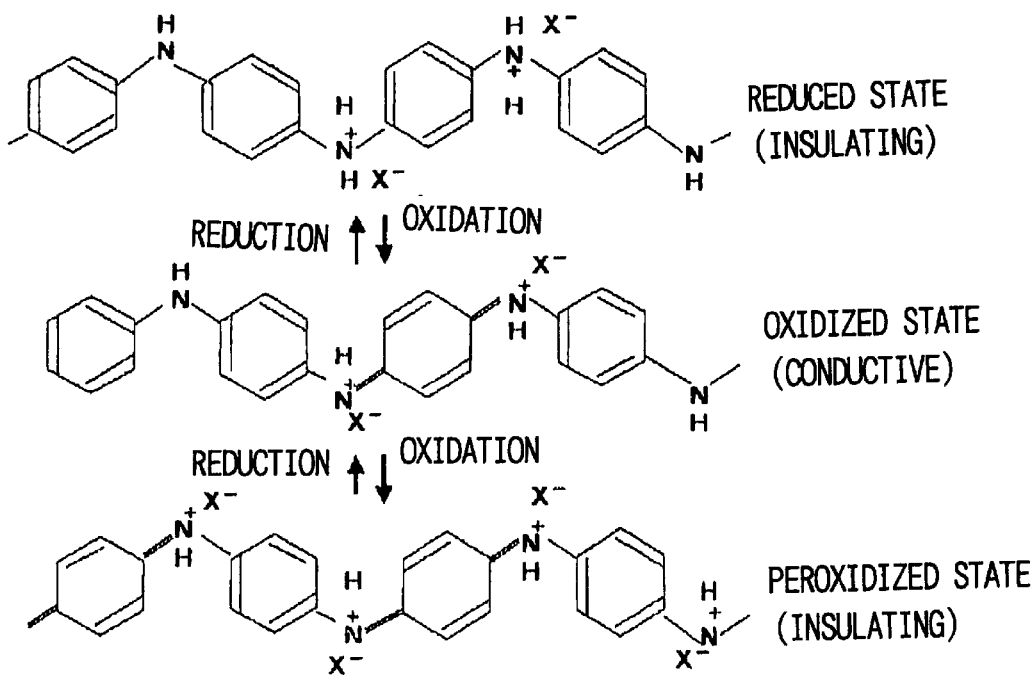
FIG. 8 is a diagram showing a charge/discharge reaction equation of a positive-electrode active material PAn in the secondary battery according to the first example of the present invention.

The organic polymer which produces the oxidation-reduction reaction due to electrochemical proton adsorption and desorption, namely the positive-electrode and negative-electrode active material used in the present invention, e.g., the nitrogen compound polymer, has a charge/discharge mechanism similar to that exemplified in FIGS. 7 and 8. A compound of this kind attains a state in which nitrogen atoms in the Mecules are protonated by anions in the electrolyte, and thus the compound has a redox capability.

Figure 3:
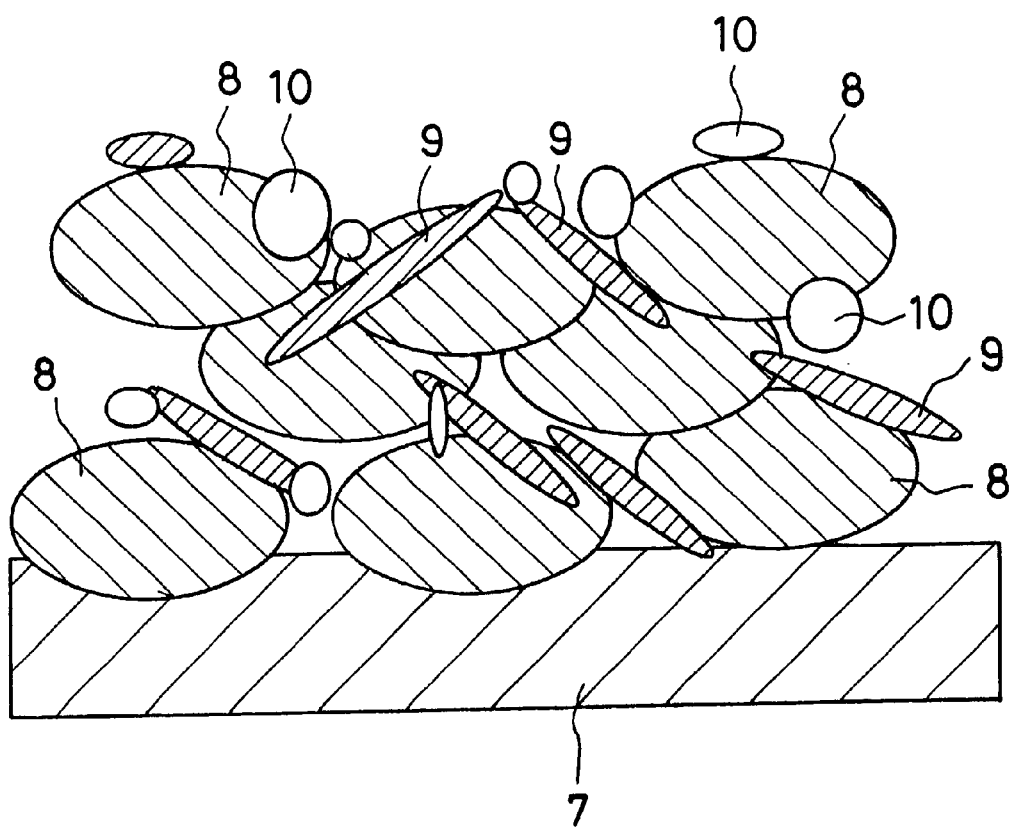
FIG. 3 is a schematic, enlarged sectional view of a conventional electrode for a secondary battery that uses an organic binder, the view being taken in the thickness direction of a collector.

Accordingly, it is vital that adequate area of contact between the active material and the electrolyte be assured. With the conventional battery electrode, as shown diagrammatically in FIG. 3, the organic binder 10 or binding agent, which does not participate in the oxidation-reduction reaction, is mixed in to maintain the bonding strength between the active material 8 and the carbon particles 9 serving as the conduction aid or the bonding strength between the layer comprising the active material 8 and carbon particles 9 and the collector 7. The organic binder and binding agent are scattered on the surface of the active material and impede contact of the active material with the electrolyte. As a result, protonation of the active material does not proceed sufficiently.

The organic binder and binding agent exhibit absolutely no electron conductivity. Consequently, if the organic binder or binding agent resides between grains of the active material and the carbon material, electron conduction from the collector is impeded. For these two reasons, a secondary battery using the conventional battery electrodes exhibits insufficient proton and electron conductivity at the surface of the active material of the electrodes and, hence, the capacity of the battery is too small.

Figure 2:
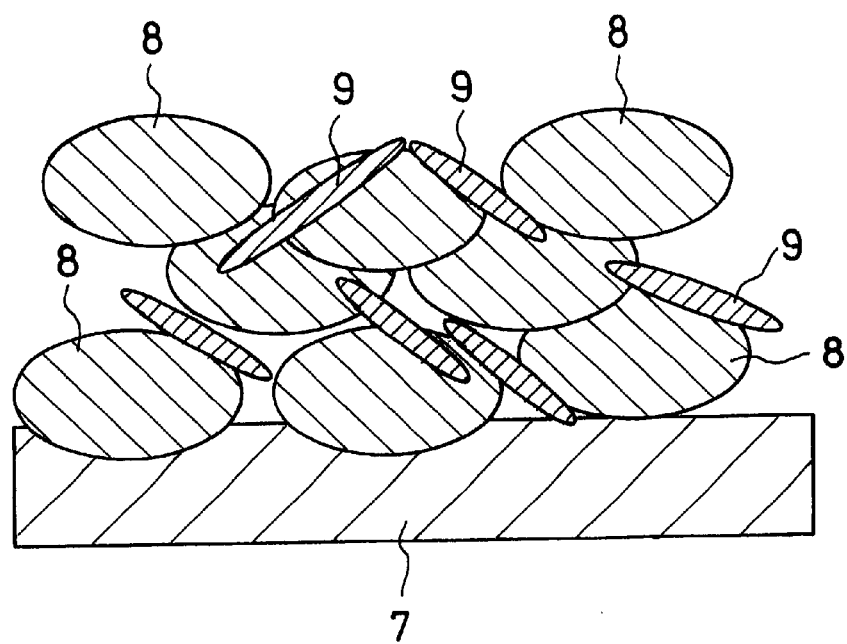
FIG. 2 is a schematic, enlarged sectional view of an electrode used in a secondary battery according to the first example of the present invention, the view being taken in the thickness direction of a collector.
Figure 5:
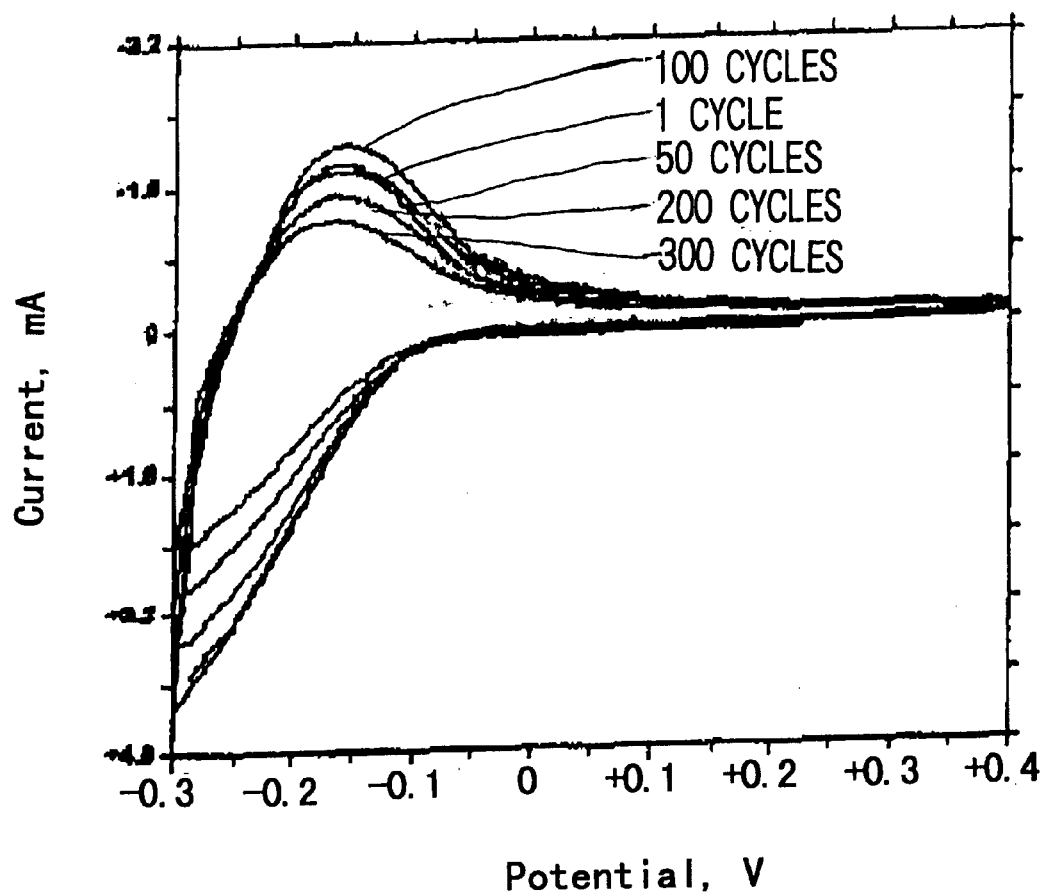
FIG. 5 is a cyclic voltammogram of a negative electrode (Ppy electrode) fabricated in accordance with the first example of the present invention.

By contrast, in accordance with the present invention, as shown diagrammatically in FIG. 2, use is made of an electrode obtained by coating the collector 7 with a solution containing carbon particles 9 in dispersed form and the active material 8 in dissolved form, and drying the solution on the collector to thereby fix the dried layer consisting of the active material 8 and carbon particles 9 on the surface of the collector 7 using the fixing strength of the active material per se without relying upon any organic binder. As a result, the area of contact between the electrolyte and active material 8 is adequately maintained and protonation of the active material proceeds with facility. Further, since the oxidation-reduction reaction is promoted conjointly with the improvement in the electron conductivity of the electrode, there is a pronounced improvement in the yielding rate of capacity. FIG. 5 illustrates a cyclic voltammogram (CV) of polypyridine, which is one type of nitrogen quinone compound, in an electrolyte (an aqueous solution of polyvinylsulfonic acid). Here use was made of an electrode obtained by coating a collector with an electrode mixture and then drying the electrode mixture, in which the electrode mixture was obtained by dissolving polypyridine in formic acid and mixing in carbon powder.

Figure 6:
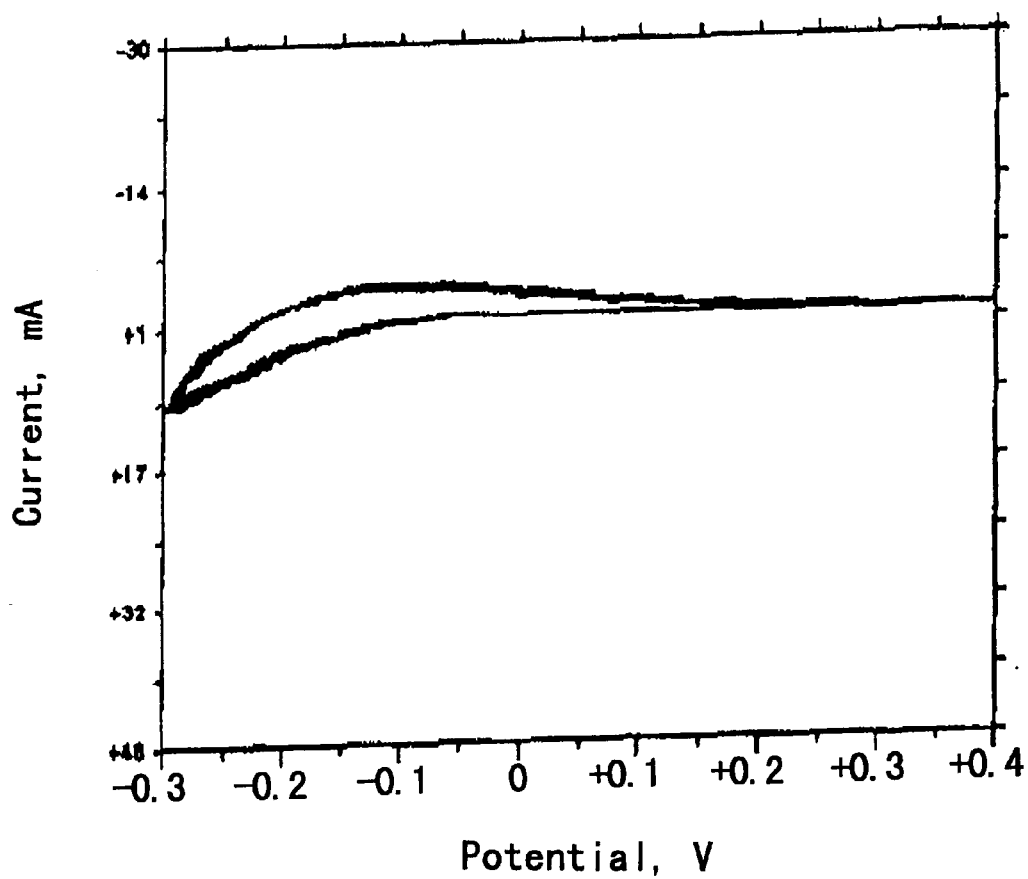
FIG. 6 is a cyclic voltammogram of a negative electrode (Ppy electrode) fabricated in accordance with the method of a comparative example useful in describing a well-known charge/discharge reaction mechanism according to the prior art.

FIG. 6, on the other hand, illustrates a cyclic voltammogram (CV) of an electrode obtained by using polypyridine, carbon powder and, moreover, polyvinylidene fluoride as a binding agent. A comparison of FIGS. 5 and 6 clearly shows that, in the case of the electrode (FIG. 5) fabricated without using any binding agent, the observed reaction current is large and there is very little decrease in reaction current accompanied by repeated potential scanning. With the electrode (FIG. 6) fabricated using a binding agent, however, reaction current is exceedingly weak. The reason for this difference in the two electrodes is that with the electrode of the present invention, as touched upon earlier, the area of reaction between the active material and electrolyte is enlarged, the polypyridine readily undergoes protonation owing to the polyvinylsulfonic acid, which is the anion contained in the electrolyte, and the oxidation-reduction reaction is promoted conjointly with the improvement in the electron conductivity of the electrode.

More specifically, according to the present invention, regardless of the fact that no use is made of organic binder or binding agent, no attenuation in reaction current accompanying repeated potentially scanning is found. In other words, the cycle characteristics associated with repeated charging and, discharging is fully maintained. In an ordinary secondary battery, the bonding between the active material and the carbon material or the bonding between the electrode and the collector relaxes, thereby degrading cycle characteristics, as a result of repeated volumetric expansion and contraction of the electrode that accompanies repeated withdrawal and insertion of ions, which are the charge carriers, with respect to the electrode at charging and discharging of the battery. In order to suppress this degradation in cycle characteristics, the organic binder or binding agent is an essential constituent of the electrodes for a secondary battery. In accordance with the present invention, however, protons of small size are used as the charge-carrier ions and, hence, a volumetric change in the polymer matrix of the active material that accompanies the entry and exit of protons to and from the electrode is small. In addition, owing to the integrity of the structure of the organic polymer serving as the active material, cycle characteristics is assured.

(2) <Suppression of Coalescence and of Decline in Fluidity of the Electrode Mixture at the Time of Electrode-film Manufacture>

Ordinarily, in the manufacture of a battery electrode, an electrode paste is produced by dispersing an active material, a conduction aid such as a powder of a carbon material, and an organic binder (or binding agent) in a suitable solvent, a collector is coated with the electrode mixture by casting or spin coating and the solvent is then removed to form a film coating. However, since the major portion of the organic polymer is bulky and has a low specific gravity, it is difficult to maintain a stable dispersed state in the solvent for an extended period of time.

Further, most organic binders are straight-chain organic polymers and are used upon being dissolved in a polar solvent. However, many organic polymers serving as the active material have a high affinity to such solvent and coalescence between the particles of the active material, or association and coalescence between the active material and the carbon material, proceeds from the moment the solvent and the organic polymer are mixed together.

According to the present invention, absolutely no organic binder is used. After the solvent is selected, the organic polymer serving as the active material is dissolved in the solvent, preferably, completely and an electrode can be produced while constantly maintaining ideal dispersibility and fluidity of the electrode mixture. In addition, it is possible to combine two or more types of organic polymers and use the combination as the active material of the battery. In such case it would suffice for one type of the organic polymer to be soluble in water or in a prescribed solvent, thus making it possible to produce an electrode mixture exhibiting outstanding fluidity as well as workability at the time of film manufacture. This advantageous feature facilitates also the manufacture of an electrode in which an insoluble organic polymer such as electrically conductive polyaniline is adopted as the active material. Thus there can be provided an electrode and battery manufacturing process having excellent workability and productivity.

Detailed examples of the present invention will be described below.

EXAMPLE 1

Construction of Secondary Battery According to Example 1

The construction of a secondary battery according to Example 1 will be described with reference to FIG. 1.

FIG. 1 is a schematic, enlarged sectional view of a secondary battery according to Example 1 of the present invention, the view being taken in the thickness direction of the collector of a negative electrode. A layer 3 containing a negative-electrode active material includes polypyridine (referred to as "Ppy" below) as an active material but is devoid of any organic binder. A layer 2 containing a positive-electrode active material uses polyaniline doped with para-toluenesulfonic acid anion (referred to as "PAn/p-TS$^-$" below) as an active material, and a very small amount of polyvinylidene fluoride (referred to as "PVDF" below) is mixed in as a binder.

A positive electrode is produced by forming the layer 2, which contains the positive-electrode active material, as a film to a thickness of 20 $\mu$m on an electrically conductive film serving as a positive-electrode collector 1. A negative electrode is produced by forming the layer 3, which contains the negative-electrode active material, as a film to a thickness of 20 $\mu$m on an electrically conductive film serving as a negative-electrode collector 4. The positive electrode and negative electrode are arranged to oppose each other across an electrolyte 5, which is 3M of an aqueous solution of polyvinylsulfonic acid (referred to as "PVSA" below), and an ion-permeable insulating porous separator 6 disposed within the electrolyte 5 and having a thickness of 25 $\mu$m. The porous separator 6 is disposed approximately in parallel with the layer 3 containing the negative-electrode active material. It should be noted that the positive electrode and negative electrode in FIG. 1 are drawn to have a thickness greater than that of the separator 6 in order to facilitate an understanding of the construction of the secondary battery.

Formation of Secondary Battery According to the Example 1

Forming the battery according to this example comprises the three steps of (1) preparing the electrode mixture, (2) fabricating the electrodes and checking their characteristics, and (3) assembling the battery.

Step (1), namely the method of preparing the electrode mixture according to this example, will be described first.

By using an agate mortar, Ppy powder (weight-average Mecular weight: 10500) serving as the negative-electrode active material was ground to less than 60 mesh (JIS). This was followed by kneading while gradually adding an aqueous solution of 3M of formic acid. Dissolution of the Ppy powder was verified from the fact that the aqueous solution of formic acid changed to a yellowish-brown color.

Carbon powder serving as a conduction aid was mixed with the Ppy so as to obtain 70:30 as the weight ratio in regard to Ppy. The mixture was kneaded to prepare a paste-like negative-electrode mixture. The average particle diameter of the carbon powder used was 10 $\mu$m.

The positive-electrode active material was PAn/p-TS$^-$, produced by adding an ethanol solution of 1M para-toluenesulfonic acid to undoped polyaniline obtained by chemical polymerization, and stirring the mixture at 70° C. for six hours to achieve doping. After the PAn/p-TS$^-$ was ground to less than 60 mesh using an agate mortar, the doped polyaniline was weighted in a weight ratio of 70:30 relative to polyaniline amount of the negative electrode. Then carbon powder (having an average particle diameter of 10 $\mu$m) serving as a conduction aid was mixed. To the resultant mixture (about 50 mg) several drops (about 100 $\mu$ liter) of a 10% PVDF-solution in a solvent of N-methyl-2-pyrrolidone (referred to as "NMP" below) serving as a binder and then by further kneading, thereby preparing the positive-electrode mixture of a viscous paste with a flowability resulting in a mixture of PAn/p-TS$^-$:Carbon:PVDF=69:23:8 by weight.

Step (2), namely electrode fabrication and checking of the electrode characteristics, will be described in detail.

Masking patterns made of polypropylene having an area of 6.25 cm$^2$ and a thickness of 100 $\mu$m were placed on electrically conductive films serving as the collectors 1, 4 in FIG. 1, films of the positive- and negative-electrode mixtures where formed thereon by casting and this was followed by vacuum-drying at 80° C., whereby electrodes having an area of 6.25 cm$^2$ and a thickness of 20 $\mu$m were obtained.

Next, the characteristics of the negative electrode obtained were checked.

Figure 4:
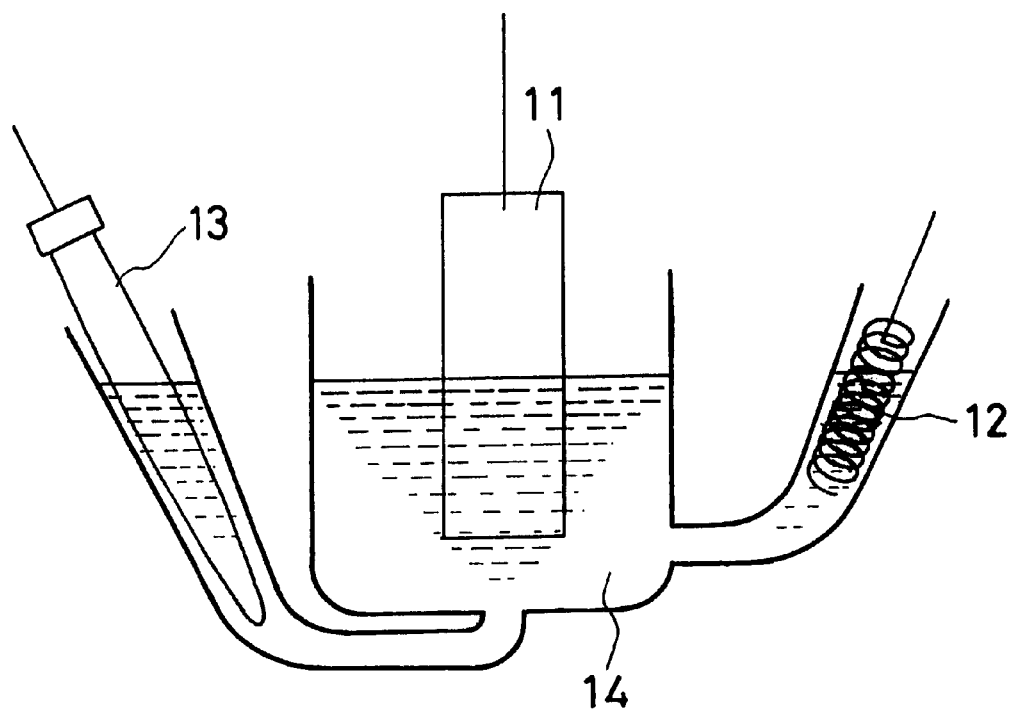
FIG. 4 is a diagrammatic view of a cell in a measurement system used in a characteristic check (CV measurement) of a fabricated electrode.

FIG. 4 is a diagrammatic view of a cell in a measurement system used in checking the electrochemical characteristics of the active material of the electrode. A three mol PVSA aqueous solution was used as a measurement solution 14, a silver/silver-chloride electrode serving as a reference electrode 13 and the Ppy electrode fabricated as a working electrode 11 were immersed in the measurement solution 14 and the electrochemical characteristics of the Ppy electrode were examined. Numeral 12 in FIG. 4 denotes an opposing electrode. FIG. 5 illustrates the cyclic voltammogram (abbreviated to "CV" hereafter) of the Ppy electrode obtained.

The natural potential of the Ppy electrode was measured first. The potential at such time was about +0.32 V. Next, the potential was swept with respect to a reference electrode at 20 mV/s from the natural potential to −0.3 V in the direction of lower potential and then to +0.4 V in the direction of higher potential. The CV of FIG. 5 is the result of sweeping potential repeatedly over the range of from +0.4 to −0.3 V.

Taking note of the current values plotted along the vertical axis, the peak of the reaction current values was observed in the vicinity of −0.12 V, and it was verified that the peak value increases gradually as the sweeping of potential is repeated from 1 cycle, reaching a maximum at 100 cycles. Thereafter the peak value decreases gradually to become stable curves after 300 cycles. According to this example, the peak of the oxidizing current in the vicinity of −0.12 V is used as the discharge reaction of the negative electrode. When this voltammogram was integrated to determine the amount of discharged electric charge that corresponds to the area of the peak, 38.8 mAh/g was obtained in terms of per unit weight of the electrode.

The third step, namely the assembly of the battery, will be described next.

The fabricated electrodes were placed in a glass beaker inside a bell jar, pressure was reduced to less than 40 Torr for 30 minutes and a 3M PVSA aqueous solution serving as the electrolyte 5 was introduced and allowed to permeate the electrodes. The positive electrode and negative electrode were stacked opposing each other across a separator made of polypropylene, thereby assembling the battery.

Operation of Secondary Battery According to the Example 1

Reference will be had to FIGS. 7 and 8 to render a detailed description of the operating principle of the second battery according to Example 1 illustrated in FIG. 1. FIG. 7 is a diagram showing the mechanism of the charge/discharge reaction of Ppy, which is the active material of the negative electrode. When the secondary battery is charged, nitrogen atoms in the Ppy are protonated and reduced. The reduction reaction is the charging mechanism of the Ppy electrodes. The oxidation reaction takes place owing to elimination (releasing) of protons from the protonated nitrogen atoms in the polypyridine. This oxidation reaction is the discharge mechanism of the Ppy electrodes.

FIG. 8 is a diagram showing the mechanism of the charge/discharge reaction of polyaniline PAn of the positive electrode. Electrons in the nitrogen atoms of the PAn (insulating, reduced state) are extracted by an oxidation reaction, whereupon protons bound or coordinated to the nitrogen atoms are removed and released into the electrolyte, causing a change from a phenylenediamine structure to a quinonediimide structure that is conductive. When further oxidation takes place, there is a change to a peroxidized state doped with the anions in the electrolyte, and the polyaniline becomes an insulator again. However, this reaction in the aqueous solution is irreversible, as reported in Technological Report 87, 33(1988) of the Institute of Electrical Information Communications. For this reason, a good cycle characteristic is not obtained when use is made of an oxidation-reduction reaction between an oxidized state and a peroxidized state.

A polymer battery according to the present invention achieves a good cycling efficiency by utilizing the first oxidation-reduction equation in which reversibility is obtained, namely oxidation-reduction based upon proton adsorption/desorption in the active material accompanying migration of electrons. On the other hand, the reduction reaction is produced by the PAn receiving electrons via an electron conduction network composed of the collector and the carbon material serving as the conduction aid, and adsorption of the protons in the electrolyte onto the nitrogen atoms, causing a change from the quinonediimide structure to the phenylenediamine structure. This reduction reaction is explained as the discharge reaction mechanism of the PAn electrode.

The electrode (negative-electrode) having the structure according to this example has absolutely no organic binder on the surface of the particles of the active material and between the particles of the active material and the carbon powder. In other words, as mentioned earlier, the entirety of the organic polymer constituting the electrode is regarded as the active material, and sufficient area of contact between the electrolyte and the active material is assured. Accordingly, the protonation of the PAn of the positive electrode and of the Ppy of the negative electrode proceeds in excel lent fashion. Owing to the improved electron conductivity, the migration of electric charge from external circuitry via the collector proceeds rapidly. As a result, the above-mentioned electrode reactions are promoted, the active materials of the positive electrode and negative electrode are utilized efficiently and a capacity that greatly exceeds that of the conventional battery is obtained.

Effects of the Example 1

The following measurements were performed in order to verify the effects of this example:

(1) <Cycling Characteristic of Discharge Capacity>

The fabricated battery was charged at 0.9 V for 30 min, left quiescent for 5 min and then discharged to a termination voltage of 0.1 V at 0.1 C. This operation was repeated as one cycle and the discharge capacity was measured every cycle. As a result, a discharge capacity of 9.5 mAh was obtained. This value was maintained for up to 8000 cycles.

(2) <Measurement of Internal Impedance>

The DC internal impedance of the fabricated battery was measured. As a result, the internal impedance of the battery was found to be 45 m$\Omega$.

(3) <Statistical Analysis of Battery Capacity Distribution>

The fabricated battery was charged at 0.9 V for 30 min, left quiescent for 5 min and then discharged to a termination voltage of 0.1 V at 0.1 C. A similar measurement was performed with regard to an n=100 p cells, and the average value and standard deviation of the discharge capacity were determined. The average value obtained was 10.1 mAh, and the standard deviation was 0.081 mAh. The foregoing results were gathered together in Table 1 below together with other examples and comparison examples, described later. More specifically, Table 1 illustrates a comparison of the performance of batteries according to various examples with the performance of batteries according to comparison examples.

TABLE 1

| | DISCHARGE CAPACITY OF INITIAL CYCLE (mAh) | INTERNAL IMPEDANCE (mΩ) | NUMBER OF CYCLES TILL 80% RESIDUAL CAPACITY | DISTRIBUTION OF BATTERY CAPACITY (n = 100 p) | |
|---|---|---|---|---|---|
| | | | | AVERAGE VALUE (mAh) | STANDARD DEVIATION (mAh) |
| Example 1 | 9.5 | 45 | 8526 | 10.1 | 0.081 |
| Comparison Example 1 | 1.2 | 250 | 2365 | 0.86 | 0.33 |
| Example 2 | 11.0 | 21 | 10526 | 11.5 | 0.051 |
| Comparison Example 2 | 0.56 | 375 | 256 | 0.62 | 0.28 |
| Example 3 | 4.1 | 78 | 2536 | 4.5 | 0.009 |
| Comparison Example 3 | 0.21 | 521 | 126 | 0.21 | 0.11 |
| Example 4 | 9.0 | 120 | 9426 | 8.5 | 0.041 |
| Example 5 | 17.3 | 53 | 11256 | 19.3 | 0.061 |
| Example 6 | 2.3 | 601 | 5012 | 2.6 | 0.19 |

COMPARISON EXAMPLE 1

Construction of Comparison Example 1

The construction of the battery according to Comparative Example 1 is no different from that of Example 1 except for the fact that after the negative-electrode active material Ppy and carbon material were mixed, an NMP solution of PVDF serving as binder was added, not formic acid, to prepare the negative electrode. In other words, a PAn electrode fabricated through a method identical with that of the first embodiment was used as the positive electrode, a Ppy electrode fabricated with the addition of PVDF binder was used as the negative electrode, and the two electrodes were arranged to oppose each other across a 3M PVSA aqueous solution and a separator to obtain the battery. The composition was (Ppy70:carbon30):PVDF=90:10, i.e., Ppy:Carbon:PVDF=63:27:10.

Operation of Battery According to Comparison Example 1

The operation (principle) of the battery according to Comparison Example 1 is almost the same as that of Example 1. FIG. 6 illustrates the CV curves obtained when the characteristics were checked after completion of the negative electrode. The reaction current associated with potential scanning is weak, and the amount of electric charge at electrification obtained by integration processing is only 3.6 mAh/g per electrode weight. With the construction of the Comparison Example 1, the binder of PVDF resides in scattered form on the Ppy surface of the negative-electrode active material and partially impedes contact with the aqueous solution of PVSA serving as the electrolyte, thereby making it difficult for the protonation of the Ppy to proceed. Further, coupled with the fact that the PVDF resides scattered between the Ppy and the carbon powder and partially interrupts the electron conduction network of the electrode, the rate of capacity per volume (volume performance rate) of the fabricated battery is low and the internal impedance high. In addition, since workability of film manufacture of the negative electrode is very poor, there are pronounced variations in film thickness and weight from one electrode to the next and an increase in the standard deviation of battery capacity.

EXAMPLE 2

Construction of Example 2

This example is an example in which a polymer of water-soluble anilinesulfonic acid in addition to PAn/p-TS⁻ was used as the positive-electrode active material; no organic binder was employed. After PAn/p-TS⁻ powder, carbon powder serving as the conduction aid and polyanilinesulfonic acid having a weight-average Mecular weight of 8500 were mixed at a weight ratio of 76:12:12, these ingredients where kneaded while gradually adding pure water. Since the polyanilinesulfonic acid is water soluble, the mixture took on a paste-like consistency in which the three ingredients were mixed uniformly. A film of this mixture was formed on an electrically conductive film serving as the collector, thereby completing the positive electrode. Components (structure) other than the positive electrode were the same as in Example 1, and the battery was completed through a method exactly the same as that of Example 1.

Operation of Secondary Battery According to Example 2

The polyanilinesulfonic acid according to Example 2 is a derivative of PAn, and a notable feature is that it functions as an active material because is brings about an oxidation-reduction reaction, which is associated with proton adsorption/desorption with respect to nitrogen atoms, comparable with ordinary unsubstituted PAn. However, owing to the fact that polyanilinesulfonic acid is water soluble, elution into the electrolyte solution with the passage of time is promoted attendant upon an increase in the water content in the electrolyte solution and a decrease in the viscosity. Self-discharge of the battery manifests itself as a result. It is important, therefore, to raise the concentration of the electrolyte and maintain the viscosity of the solution. Because a concentration of 1M or greater was ideal in the case of an aqueous solution of PVSA, the concentration of the solution was made 3M in Example 2. If another electrolyte is used, it will also suffice to select an appropriate concentration within such limits that ion conductivity will be maintained without dissolution of the polyanilinesulfonic acid.

Effects of Example 2

It was confirmed that Example 2 improved upon the effects of increased capacity and reduced internal impedance achieved by not using organic binder in the negative electrode. Since organic binder was eliminated also from the positive electrode and the entire organic polymer was made the active material, it will be understood that battery performance is made even higher than that of Example 1.

COMPARISON EXAMPLE 2

Construction of Comparison Example 2

The positive electrode in this example was an electrode composed of PAn/p-TS$^-$, polyanilinesulfonic acid and carbon powder, similar to Example 2. A Ppy electrode formed using PVDF binder was employed as the negative electrode. Other components (structure) were exactly the same as those used in Example 2. Ppy:Carbon:PVDF=63:27:10

Operation Principle of Battery According to Comparison Example 2

The operation principle of the battery according to Comparison Example 2 was exactly the same as that of Example 2. PVDF was present in scattered form on the Ppy surface of the negative-electrode active material and between the Ppy and carbon powder, and a satisfactory capacity could not be achieved for the negative electrode. Consequently, regardless of the fact that binder was removed from the positive electrode and the oxidation-reduction reaction of PAn was facilitated, a negative-electrode capacity commensurate therewith could not be obtained. As a result, the capacity of the overall battery was small.

EXAMPLE 3

Construction of Example 3

Example 3 is one in which polypyrimidinediyl (referred to as "Ppym" below) was used instead of Ppy as the negative-electrode active material. Ppym powder was ground to less than 60 mesh and then kneaded while 6M aqueous solution of formic acid was gradually added thereto. Dissolution of the Ppym powder was verified from the fact that the aqueous solution of formic acid changed to a reddish-brown color.

Carbon powder (having an average particle diameter 10 $\mu$m) serving as a conduction aid was mixed with the Ppym so as to obtain 70:30 (Ppym:carbon) as the weight ratio. The mixture was kneaded to prepare a paste-like negative-electrode mixture. The mixture was used to form a film on electrically conductive film serving as the collector, thereby fabricating a Ppym electrode.

As in Example 1, PAn/p-TS$^-$ was used as the positive-electrode active material and a trace amount of a PVDF-NMP solution was added to fabricate an electrode. The electrolyte, separator and other components, with the exception of the electrodes, where exactly the same as those of Examples 1 and 2.

Operation of Example 3

The operation of the battery Example 3 has a reaction potential of the negative electrode Ppym by about 0.25 V high-oxidation side as compared to the case with polypyridine. Thus, the reaction potential difference between the positive and negative electrode is narrowed by 0.25 V as compared to Examples 1 and 2. Accordingly, the charging voltage of the battery was set at 0.65 V. The operation, except for this point, is the same as Examples 1 and 2.

Effects of Example 3

In comparison with Example 1, which employed Ppy as the negative electrode, battery capacity was somewhat smaller but the cycling characteristic was maintained sufficiently. It will thus be understood that the battery functions satisfactorily as a secondary battery.

COMPARISON EXAMPLE 3

Construction of Comparison Example 3

A Ppym electrode formed using a PVDF binder was employed as the negative electrode. Other components were exactly the same as those of Example 2. Ppym:Carbon:PVDF=63:27:10

Operation of Battery According to Comparison Example 3

Battery capacity was extremely small and the cycle characteristic was very poor. It will thus be understood that the battery hardly functioned satisfactorily as a secondary battery.

EXAMPLE 4

Construction of Example 4

In Example 4, the combination of positive electrode and negative electrode was the same as in Example 2. However, this battery used 1M solution of a tetraethyl ammonium perchlorate ethylene carbonate, which contained 1M of borofluoric acid as the proton source, as the electrolyte solution. The method of fabricating the positive electrode and negative electrode and the method of assembling the battery were the same as in Example 2.

Operation of Battery According to Example 4

The oxidation-reduction reaction of polyaniline in a non-aqueous solvent such as ethylene carbonate differs from the reaction in an aqueous solution. That is, in general, one feature is that in addition to the adsorption/desorption of protons accompanying the reaction between the reduced state and the oxidized state described with reference to FIG. 8, doping and dedoping of anions in the electrolyte solution between the oxidized state and the peroxidized state occur reversibly. As a result, there is an advantage that the operating voltage can be raised in comparison with that in an aqueous system.

However, strictly speaking, the battery of the present invention is characterized in that adsorption/desorption of protons with respect to polyaniline and polypyridine is used for charge carrying purposes. Since the doping and dedoping reaction of anions in the electrolyte solution brought about in the high-potential region is not utilized, the operating principle of the battery according to Example 3 is substantially the same as that of the battery in Example 2.

Effects of Example 4

Values of rate of capacity performance per volume and cycling efficiency obtained according to Example 4 where equivalent to those of Example 1, and the effect of facilitating the oxidation reaction of Ppy of the negative electrode was re-confirmed. Effects peculiar to Example 4 were an increase in emf on the order of 0.5 V and a higher energy density. The reason is as follows: Since ethylene carbonate, which is a non-aqueous solvent, was used, the potential difference between the oxidation-reduction reaction due to adsorption and desorption of protons in the polyaniline of the positive electrode and the oxidation-reduction reaction due to doping and dedoping of anions in the electrolyte solution is large, and both reactions are reversible, making it possible to raise the operating voltage over that in an aqueous system. According to this example, no use was made of the region of a second oxidation-reduction reaction corresponding to the doping and dedoping of anions. However, the amount of increase in the operating voltage on the order of 0.5 V was extremely effective in comparison with the aqueous system.

EXAMPLE 5

Construction of Example 5

Example 5 is a battery in which polyaniline doped with polyvinylsulfonic acid anion (referred to as PAn/PVS$^-$ below) and 1-hydroxyanthraquinone were used as a positive-electrode active material and Ppy was used as a negative-electrode active material.

The PAn/PVS was prepared by adding 6M aqueous solution of polyvinylsulfonic acid to undoped PAn and stirring at 70° C. for six hours to achieve doping. After the PAn/PVS⁻ was ground to 60 mesh or below using an agate mortar, three ingredients, namely the PAn/PVS⁻, carbon powder and 1-hydroxyanthraquinone, were mixed at a weight ratio of 70:15; 15. When the mixture was stirred while gradually adding N,N'-dimethylformamide (referred to as "DMF" below), the 1-hydroxyanthraquinone dissolved so that there was obtained a paste-like electrode mixture in which all of the ingredients were mixed uniformly. A coating of this mixture was formed on an electrically conductive film serving as the collector, followed by drying at 120° C. for 30 min to remove the DMF and complete the positive electrode.

A Ppy electrode fabricated by dissolution in formic acid was used as the negative electrode in a manner similar to that of Example 1. Components other than the electrodes were exactly the same as in Example 1.

Operation of Battery According to Example 5

Figure 9:
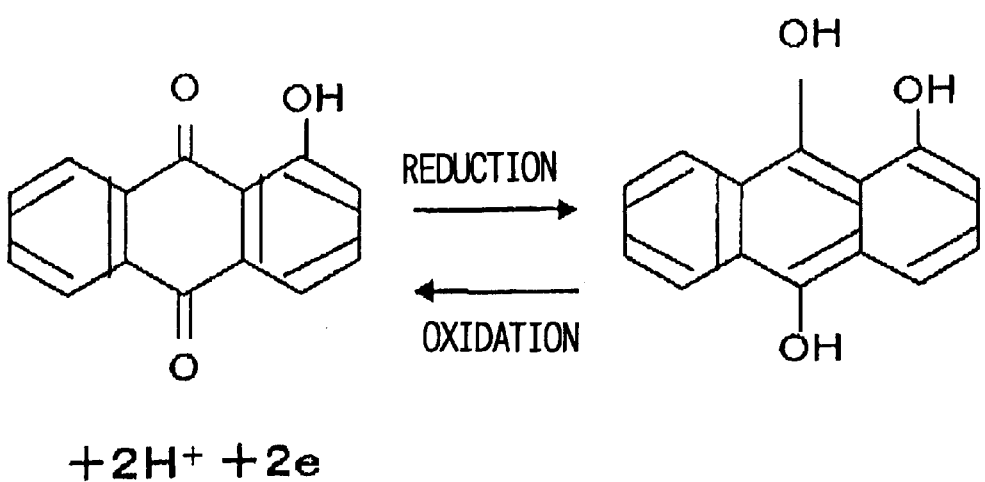
FIG. 9 is a diagram showing a charge/discharge reaction equation of a positive-electrode active material (1-hydroxyanthraquinone) in a fifth example of the present invention.

The reaction mechanism of the 1-hydroxyanthra-quinone forming the positive electrode will be described with reference to FIG. 9. Electrons at the double-bond sites are extracted by reduction, the bonds cleave and oxygen atoms become negatively charged. Protons in solution form bonds to this site to produce hydroxyl groups. In addition, oxygen atoms form double bonds again owing to oxidation and protons are released into solution. This is a charge/discharge reaction mechanism when use is made of 1-hydroxyanthraquinone as the positive-electrode active material.

Further, the quinones often are of the type in which the number of reacting electrons per Mecule is two. Theoretically, capacity associated with oxidation-reduction is large. For these reasons, quinones have been the subject of research for the purpose of raising the energy density of batteries. Quinones, however, exhibit extremely poor electron conductivity. In addition, their Mecular weight is small. Consequently, coupled with the fact that quinones become dispersed in the electrolyte solution with the lapse of time when they are used as the active material in batteries, they cannot be used independently as the active material in batteries.

In Example 5, however, quinone was mixed and combined with PAn/PVS⁻ to assure stability in the electrolyte. Though the details of the combining mechanism are not clear, it is believed that the quinoid site of the 1-hydroxyanthraquinone changes to a hydroxyl group with reduction, hydrogen bonds with the nitrogen atoms of PAn are formed, and the 1-hydroxyanthraquinone is fixed.

Effects of Example 5

Example 5 provides a performance far exceeding that of Examples 1 to 4 in terms of yielding rate of capacity (per unit weight), cycling efficiency and internal impedance. It is assumed that the reason for this is that, in addition to the effect obtained by eliminating binder from both the positive electrode and negative electrode, an interaction occurs between the oxidation-reduction of 1-hydroxyanthraquinone added to the positive electrode and the oxidation-reduction of PAn. Further, it is assumed that the reason why cycle characteristics is sufficiently maintained is that hydrogen bonds form between the PAn and nitrogen atoms and the 1-hydroxyanthraquinone is fixed in the polymer matrix of the PAn/PVS⁻ when the quinoid site of the 1-hydroxyanthraquinone changes to a hydroxyl group with reduction, as mentioned above, thereby suppressing elution into the electrolyte solution.

EXAMPLE 6

Construction of Example 6

The positive electrode and negative electrode of the battery according to Example 6 were the same as those of Example 2. However, the battery used a gel electrolyte obtained by adding a propylene carbonate solution, which contained 1M of borofluoric acid as the proton source, to "Nafion" (Aldrich), a commercially available solid electrolyte exhibiting proton conductivity, instead of the 3M aqueous solution of PVSA.

Operation of Battery According to Example 6

The charge/discharge reaction mechanism of the battery according to Example 6 was exactly the same as that of Example 2. The only differences were the source for supplying protons to the electrode active material and that the protons from the electrode active material were released into the gel electrolyte and not the aqueous solution.

Effects of Example 6

The battery of Example 6 had a somewhat smaller capacity and the internal impedance was somewhat high. This is because the proton conductivity of the gel electrolyte used is one to two orders of magnitude lower. However, no problems were found with cycling efficiency.

Furthermore, an effect peculiar to Example 6 is that leakage of fluid from the battery is suppressed. As a result, it is unnecessary to encapsulate the battery in a metal case or resin Md; a simple case will suffice. This makes it possible to obtain a battery with shape flexibility, such as a film-shaped battery.

Effects of the Present Invention

With a battery electrode according to the present invention, as described above, it is possible to improve the efficiency of utilization of the active material and to raise the yielding rate of capacity. A first reason for this is that a battery electrode according to the present invention includes at least one type of organic polymer and a carbon material which serves as a conduction aid, wherein the entirety of the organic polymer is a compound which produces an oxidation-reduction reaction due to electrochemical proton adsorption and desorption.

A second reason is that a battery electrode according to the present invention includes a dried product of a solution containing at least one type of organic polymer in dissolved form and powder of a carbon material, wherein substantially the entirety of the organic polymer is a compound which produces an oxidation-reduction reaction due to electrochemical proton adsorption and desorption.

In accordance with a secondary battery according to the present invention, it is possible to improve the efficiency of utilization of the active material and to raise the yielding rate of capacity. The reason for this is that a secondary battery according to the present invention uses a battery electrode according to the present invention as a positive electrode, a negative electrode or both.

Further, in accordance with a method of manufacturing a battery electrode according to the present invention, film manufacture workability and productivity at the time of electrode fabrication can be improved. The reason for this is that a method of manufacturing a battery electrode according to the present invention includes at least a step of forming a dried product of a solution containing at least one type of organic polymer in dissolved form and powder of a carbon material, wherein a compound which produces an oxidation-reduction reaction due to electrochemical proton adsorption and desorption is used as substantially the entirety of the organic polymer.

Further, in accordance with a method of manufacturing a secondary battery according to the present invention, film manufacture workability and productivity at the time of electrode fabrication can be improved. The reason for this is that a method of manufacturing a secondary battery according to the present invention includes using a battery electrode, which has been manufactured by the method of manufacturing a battery electrode according to the present invention, as a positive electrode, a negative electrode or both.

As many apparently widely different embodiments of the present invention can be made without departing from the spirit and scope thereof, it is to be understood that the invention is not limited to the specific embodiments thereof except as defined in the appended claims.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A battery electrode which includes:
   a collector;
   at least one type of organic high polymer; and
   a carbon material which serves as a conduction aid,
   wherein said at least one type of organic high polymer is, in its entirety, a compound which produces an oxidation-reduction reaction due to electrochemical proton adsorption and desorption, and
   wherein the organic high polymer and the carbon material are bound to each other and to the collector in the absence of an organic binder.

2. A battery electrode which includes, on a collector, a dried product of a solution containing at least one type of organic high polymer in dissolved form and powder of a carbon material,
   wherein said at least one type of organic high polymer is, in its entirety, a compound which produces an oxidation-reduction reaction due to electrochemical proton adsorption and desorption, and
   wherein the organic high polymer and the carbon material are bound to each other and to the collector in the absence of an organic binder.

3. The battery electrode according to claim 1, wherein said at least one organic polymer constituting the electrode is at least one type selected from π-conjugated high polymers, which include nitrogen atoms, and polymers of derivatives thereof.

4. The battery electrode according to claim 1, wherein said at least one organic polymer constituting the electrode is at least one type selected from the group consisting of polymers of quinone compounds, derivatives thereof.

5. The battery electrode according to claim 3, wherein the electrode is for a positive electrode and said at least one organic polymer constituting the electrode is at least one type selected from polymers of π-conjugated high polymers having an amino group within the Mecule.

6. The battery electrode according to claim 3, wherein the electrode is for a negative electrode and said at least one organic polymer constituting the electrode is at least one selected from the group consisting polymers of pyridine, pyrimidine and derivatives thereof.

7. The battery electrode according to claim 4, wherein the electrode is for a positive electrode and a negative electrode and said quinone compounds and derivatives thereof are naphthoquinone, anthraquinone and derivatives thereof.

8. The battery electrode according to claim 1, wherein the electrode is for a positive electrode and a negative electrode containing at least one of quinone compound, and said quinone compound is at least one selected from the group consisting of naphthoquinone, anthraquinone and derivatives thereof.

9. A secondary battery wherein the battery electrode defined in claim 1 is used as a positive electrode or a negative electrode or both.

10. The secondary battery according to claim 9, wherein an electrolyte contains protons and only protons participate in electron transfer that accompanies the oxidation-reduction reaction of the organic polymer in said battery electrode.

11. The secondary battery according to claim 10, wherein said electrolyte is an aqueous solution, non-aqueous solvent, solid electrolyte or gel electrolyte that either contains protons or exhibits proton conductivity.

12. A method of manufacturing a battery electrode having a collector, which includes a step of forming a dried product of a solution containing at least one type of organic high polymer in dissolved form and powder of a carbon material, and a step wherein the organic high polymer and the carbon material are bound to each other and to the collector in the absence of an organic binder, and
   wherein a compound which produces an oxidation-reduction reaction due to electrochemical proton adsorption and desorption is used as an entirety of said at least one type of organic high polymer.

13. A method of manufacturing a battery electrode having a collector, which includes the steps:
   of forming a dried product of a solution containing at least one type of organic polymer in dissolved form and powder of a carbon material, and a step;
   wherein the organic high polymer and the carbon material are bound to each other and to the collector in the absence of an organic binder,
   wherein a compound which produces an oxidation-reduction reaction due to electrochemical proton adsorption and desorption is used as an entirety of said at least one type of organic polymer; and
   coating a surface of said collector with said solution to form the dried product of said solution on the surface of said collector.

14. The method according to claim 12, wherein a polar solvent or water capable of dissolving said at least one type of organic polymer is used as a solvent of said solution.

15. The battery electrode according to claim 2, wherein said at least one type of organic high polymer constituting the electrode is at least one type selected from π-conjugated high polymers, which include nitrogen atoms.

16. The battery electrode according to claim 2, wherein said at least one type of organic high polymer a constituting the electrode is at least one type selected from the group consisting of polymerized products of quinone compounds.

17. The battery electrode according to claim 2, wherein the electrode is for a positive electrode and a negative electrode containing at least one of quinone compound, and said quinone compound is at least one selected from the group consisting of naphthoquinone and anthraquinone.

18. A secondary battery wherein the battery electrode defined in claim 2 is used as a positive electrode or a negative electrode or both.

19. The battery electrode of claim 1, wherein said at least one type of organic high polymer is naphthoquinone.

20. The electrode of claim 1, wherein an entirety of said organic high polymer is an active material in which protons are carrier ions of an electric charge.

21. The electrode of claim 2, wherein an entirety of said organic high polymer is an active material in which protons are carrier ions of an electric charge.

22. The method of claim 12, wherein an entirety of said organic high polymer is used as an active material in which protons are carrier ions of an electric charge.

23. The method of claim 13, wherein an entirety of said organic high polymer is used as an active material in which protons are carrier ions of an electric charge.

* * * * *